United States Patent
Yamamoto et al.

(10) Patent No.: US 8,794,679 B2
(45) Date of Patent: Aug. 5, 2014

(54) LOCKWIRELESS ANTI-ROTATION FITTING

(75) Inventors: Albert K. Yamamoto, Huntington Beach, CA (US); Edgar Frias, Huntington Beach, CA (US)

(73) Assignee: Alcoa Inc., Pittsburgh, PA (US)

( * ) Notice: Subject to any disclaimer, the term of this patent is extended or adjusted under 35 U.S.C. 154(b) by 72 days.

(21) Appl. No.: 12/945,258

(22) Filed: Nov. 12, 2010

(65) Prior Publication Data

US 2011/0278837 A1 Nov. 17, 2011

Related U.S. Application Data

(60) Provisional application No. 61/281,689, filed on Nov. 20, 2009.

(51) Int. Cl.
*F16L 15/08* (2006.01)
*F16L 19/00* (2006.01)

(52) U.S. Cl.
CPC .......... *F16L 19/005* (2013.01); *F16L 2201/10* (2013.01)
USPC ...................................................... 285/386

(58) Field of Classification Search
CPC .......................... F16L 19/005; F16L 2201/10
USPC ........... 285/386, 382, 901; 403/105; 411/326, 411/329, 351, 352; 464/37; 267/154, 155, 267/174, 179
See application file for complete search history.

(56) References Cited

U.S. PATENT DOCUMENTS

| | | | | |
|---|---|---|---|---|
| 687,774 A | * | 12/1901 | Oliver | 411/326 |
| 767,294 A | * | 8/1904 | Landis | 411/326 |
| 779,632 A | * | 1/1905 | Wolf | 411/326 |
| 1,691,599 A | * | 11/1928 | Zimmermann | 220/288 |
| 1,691,851 A | | 11/1928 | McCuean | |
| 2,587,810 A | * | 3/1952 | Beyer | 277/618 |
| 3,390,900 A | * | 7/1968 | McCormick et al. | 285/81 |
| 3,594,700 A | * | 7/1971 | Nava et al. | 439/315 |
| 3,673,547 A | * | 6/1972 | Ziegler, Jr. | 439/277 |

(Continued)

FOREIGN PATENT DOCUMENTS

| | | |
|---|---|---|
| WO | 9957477 | 11/1999 |
| WO | 0066930 | 11/2000 |

OTHER PUBLICATIONS

Airdrome / AF Aerospace Precision Components, EZ Locking Nut assembly, http://www.airdrone.com/ez_locking_nuthtm, downloaded Dec. 17, 2012 (1 page).

(Continued)

*Primary Examiner* — Daniel P Stodola
*Assistant Examiner* — James Linford
(74) *Attorney, Agent, or Firm* — Greenberg Traurig, LLP

(57) ABSTRACT

A lockwireless, anti-rotation fitting for attachment to connectors, including a sleeve, nut, spring, and retaining washer. The sleeve is slidably inserted within the nut and the spring is inserted on the sleeve, grips it, and locks the sleeve with the nut. The nut includes a plurality of serrations which engage a tab extending from the spring. The spring, which is semi-anchored to the nut, can only rotate inwardly or in the clockwise direction. The tab of the spring may only ratchet over the serrations when a predetermined counter-clockwise or loosening torque is applied to the nut. The serrations allow for rotation in the clockwise direction, while preventing counter-clockwise rotation until a predetermined torque is reached.

9 Claims, 9 Drawing Sheets

(56) References Cited

U.S. PATENT DOCUMENTS

| | | | |
|---|---|---|---|
| 3,858,914 A * | 1/1975 | Karie et al. | 285/238 |
| 3,917,373 A * | 11/1975 | Peterson | 439/321 |
| 4,239,314 A * | 12/1980 | Anderson et al. | 439/321 |
| 4,776,616 A * | 10/1988 | Umehara et al. | 285/133.21 |
| 4,984,995 A * | 1/1991 | Tucker et al. | 439/321 |
| 5,192,219 A * | 3/1993 | Fowler et al. | 439/321 |
| 5,851,035 A | 12/1998 | Marc et al. | |
| 5,882,044 A | 3/1999 | Sloane | |
| 5,897,277 A | 4/1999 | Barre et al. | |
| 6,293,595 B1 | 9/2001 | Marc et al. | |
| 6,302,447 B1 | 10/2001 | Lee | |
| 6,557,900 B1 | 5/2003 | Austin | |
| 6,694,827 B2 | 2/2004 | Austin | |
| 6,857,665 B2 | 2/2005 | Vyse et al. | |
| 7,032,931 B2 | 4/2006 | Austin | |
| 2004/0251681 A1 | 12/2004 | Williams et al. | |

OTHER PUBLICATIONS

International Search Report and Written Opinion issued in connection with International Application No. PCT/US2010/056528 entitled "Lockwireless Anti-Rotation Fitting" dated Feb. 14, 2011 (10 pages).

\* cited by examiner

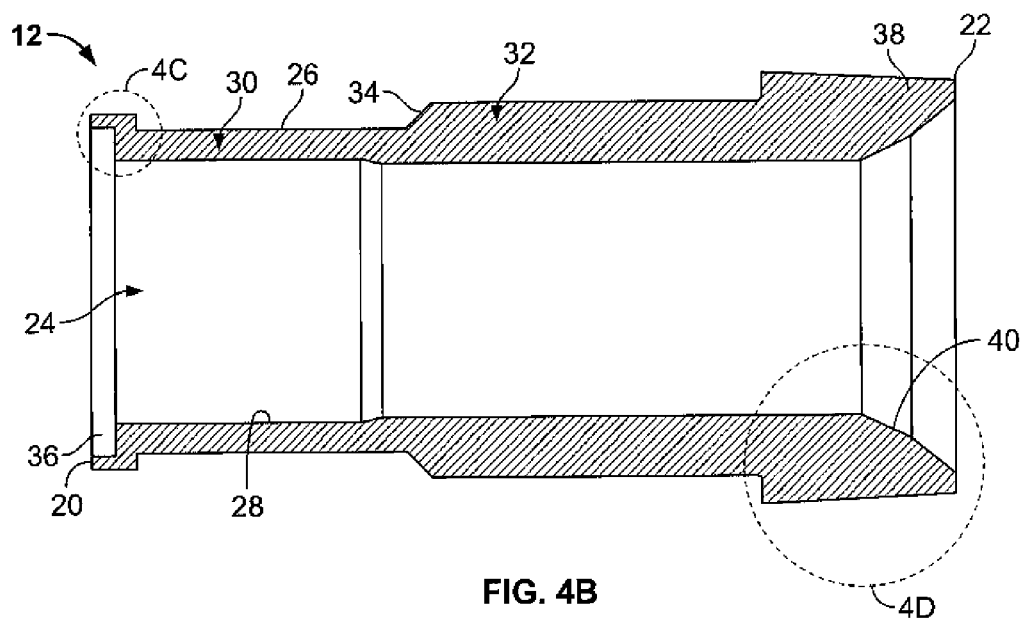
FIG. 4B
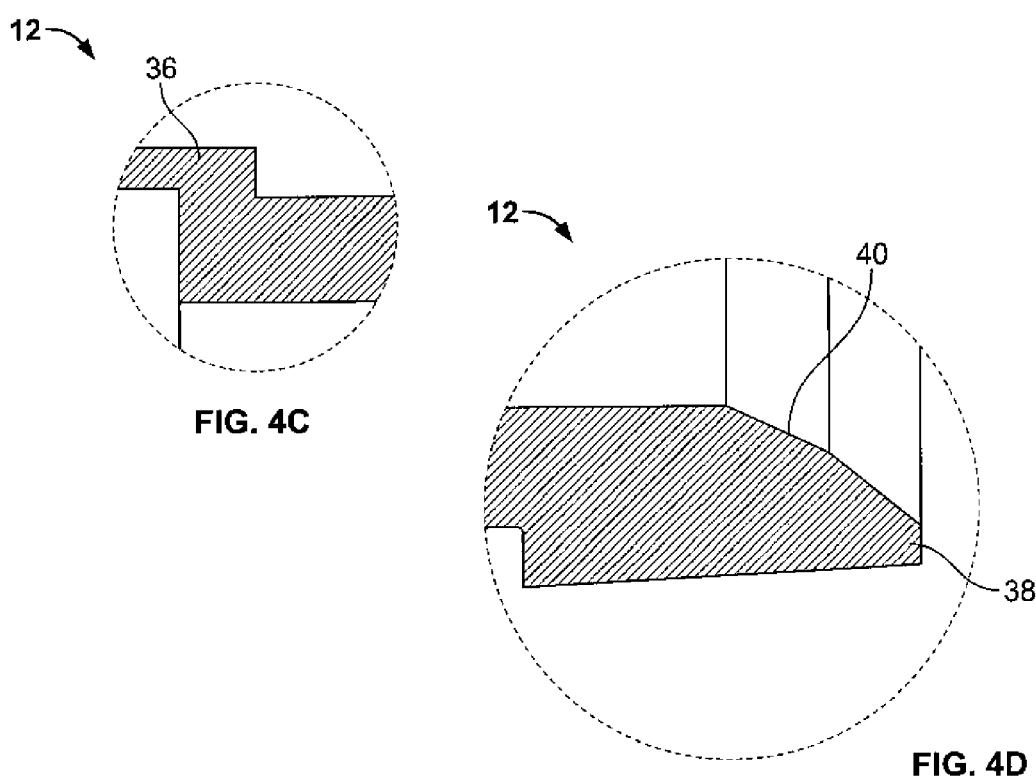
FIG. 4C
FIG. 4D

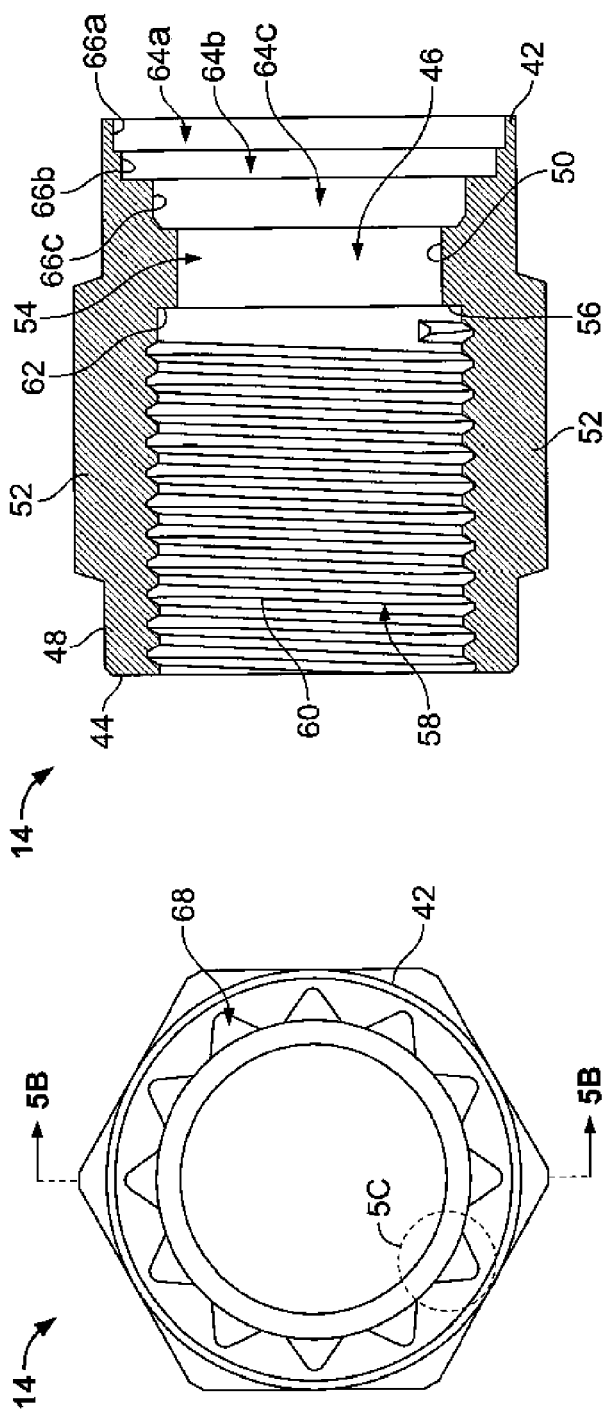

US 8,794,679 B2

LOCKWIRELESS ANTI-ROTATION FITTING

CROSS-REFERENCE TO RELATED APPLICATION

This application is a Section 111(a) application relating to commonly owned, co-pending U.S. Provisional Application Ser. No. 61/281,689 entitled "LOCKWIRELESS ANTI-ROTATION FITTING," filed Nov. 20, 2009, the entirety of which is incorporated herein by reference.

FIELD OF THE INVENTION

The present invention relates to fittings and, more particularly, to lockwireless, anti-rotation type fittings for attachment to a connector.

BACKGROUND OF THE INVENTION

Compression fittings are widely used in a variety of instrumentation, pneumatic, hydraulic, process, power, refrigeration, industrial, mobile, transportation, aerospace, military, commercial, and other fluid power or control applications utilizing plastic or metal tubing. Compression fittings have been adapted for use with many different tubing types including metals such as copper, brass, steel, stainless steel, titanium, aluminum, and alloys such as nickel-copper, Hastelloy, Alloy 600, 6Mo, Inconel, Incoloy, and the like, and many plastics. "Lockwireless" fittings, i.e., anti-rotation fittings which do not employ a lockwire, would be well-received for commercial and military aerospace use, as well as for other applications.

SUMMARY OF THE INVENTION

The present invention relates to a lockwireless, anti-rotation fitting for attachment to connectors. In an embodiment, the fitting includes a sleeve, a nut, a spring, and a retaining washer. The sleeve is slidably inserted within the nut and the spring is inserted on the sleeve, grips it, and locks the sleeve with the nut. In an embodiment, the nut includes a plurality of serrations which engage a tab extending from the spring. In an embodiment, the spring, which is semi-anchored to the nut, can only rotate inwardly or in the clockwise direction. In an embodiment, the tab of the spring may only ratchet over the serrations when a predetermined counter-clockwise or loosening torque is applied to the nut. In an embodiment, the serrations allow for rotation in the clockwise direction, while preventing counterclockwise rotation until a predetermined torque is reached in order to prevent self-loosening. In an embodiment, the spring prevents accidental loosening due to vibration of components of the system to which the fitting is attached. In an embodiment, the fitting is designed to eliminate the need for a special adapter and does not require special tooling to install or uninstall it. In an embodiment, the fitting further includes a visual indicator that indicates its proper installation.

In an embodiment, the fitting is useful in aerospace applications. In other embodiments, the fitting can be used in any application that encompasses a fluid system, such as manufacturing, automotive, etc.

Further features and advantages of the invention will appear more clearly on a reading of the detailed description of an exemplary embodiment of the invention, which is given below by way of example only with reference to the accompanying drawings.

BRIEF DESCRIPTION OF THE DRAWINGS

Reference is made to the following detailed description of the exemplary embodiment considered in conjunction with the accompanying drawings, in which:

FIG. 4B is a cross-sectional view, taken along line 4B-4B and looking in the direction of the arrows, of the sleeve shown in FIG. 4A;

FIG. 4C is an enlarged view of Detail 4C of the sleeve shown in FIG. 4B;

FIG. 4D is an enlarged view of Detail 4D of the sleeve shown in FIG. 4B;

FIG. 5A is a front elevational view of a nut employed by the fitting shown in FIG. 1;

FIG. 5B is a cross-sectional view, taken along line 5B-5B and looking in the direction of the arrows, of the nut shown in FIG. 5A;

FIG. 5C is an enlarged view of Detail 5C of the nut shown in FIG. 5A;

DETAILED DESCRIPTION OF THE DRAWINGS

Figure 1:
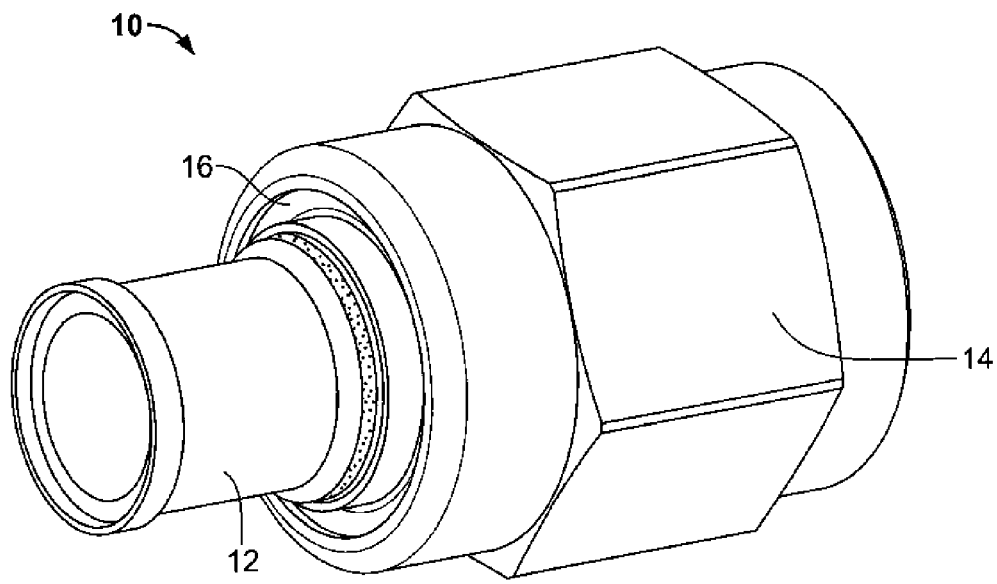
FIG. 1 is a perspective view of a lockwireless, anti-rotation fitting in accordance with an embodiment of the present invention.
Figure 2:
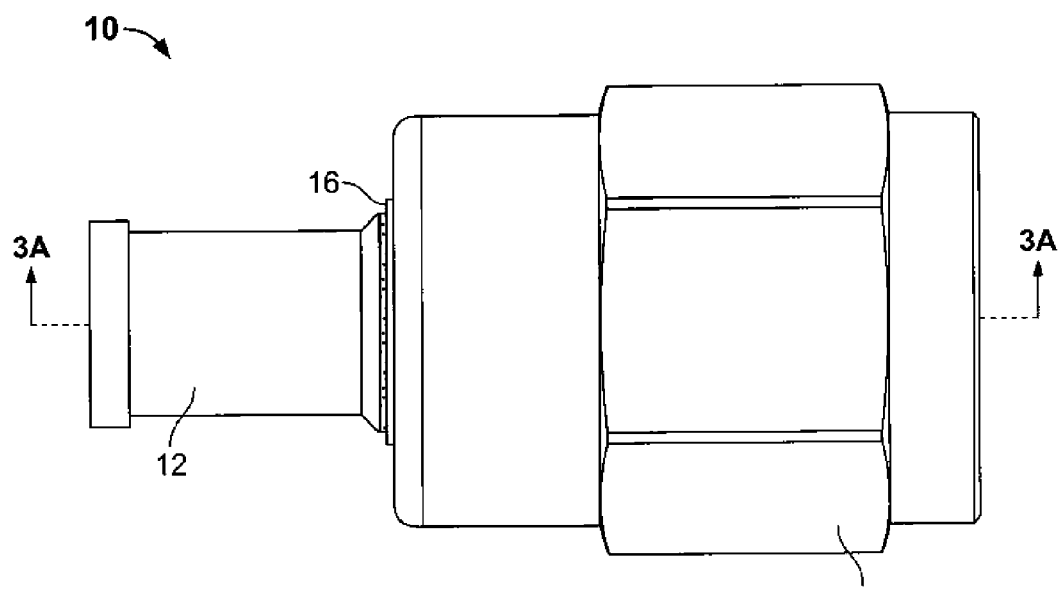
FIG. 2 is a side elevational view of the fitting shown in FIG. 1.
Figure 3A:
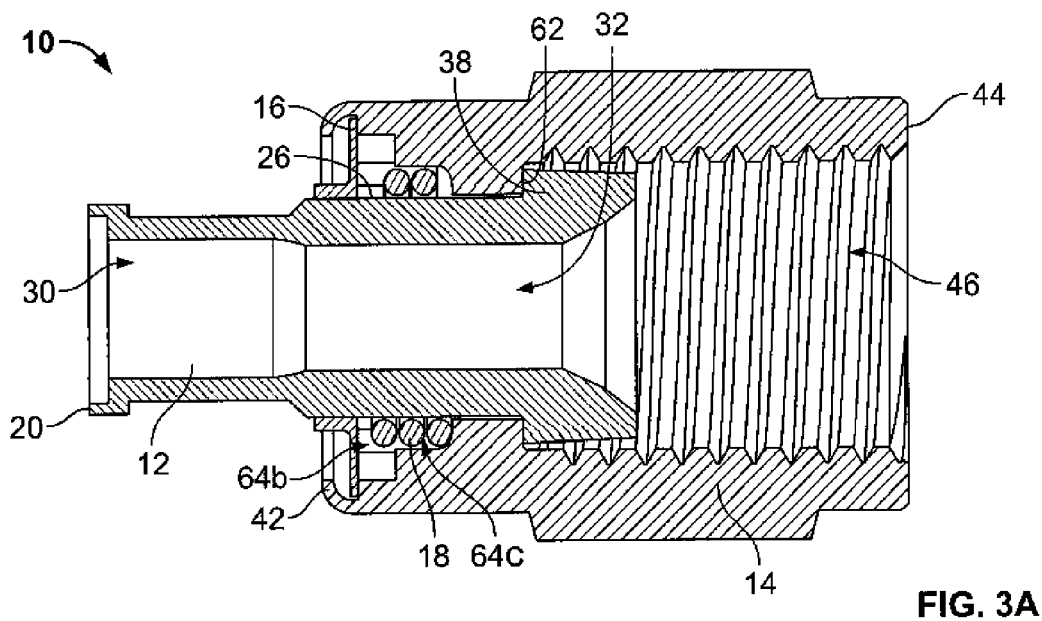
FIG. 3A is a cross-sectional view, taken along line 3A-3A and looking in the direction of the arrows, of the fitting shown in FIG. 2.
Figure 3B:
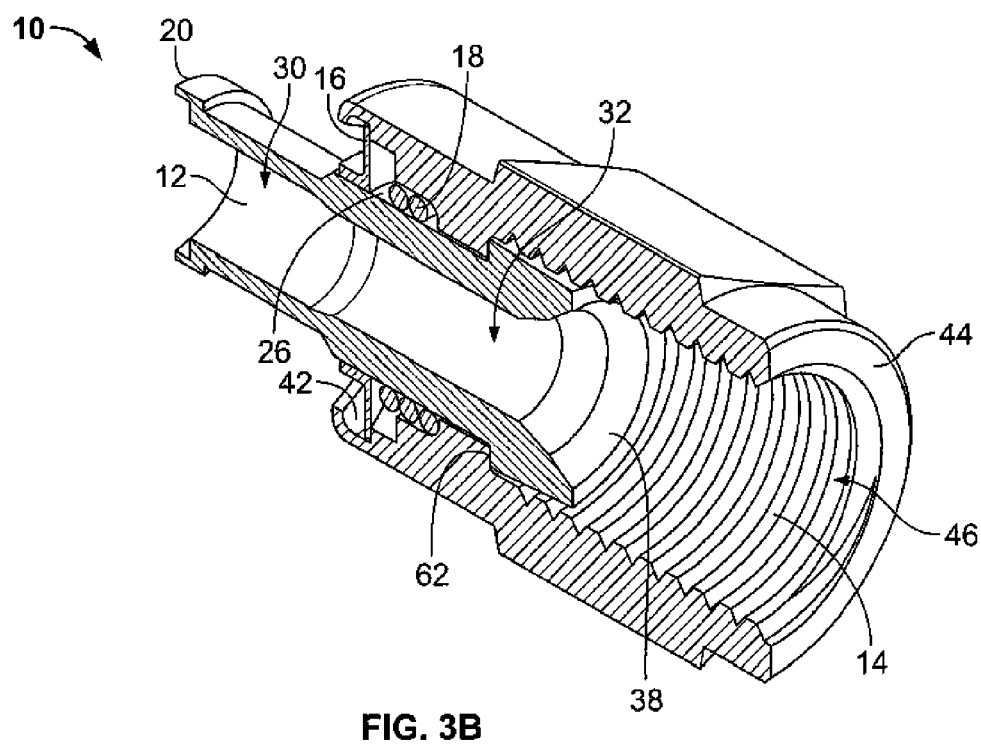
FIG. 3B is a near perspective view of the fitting shown in FIG. 3A.
Figure 3C:
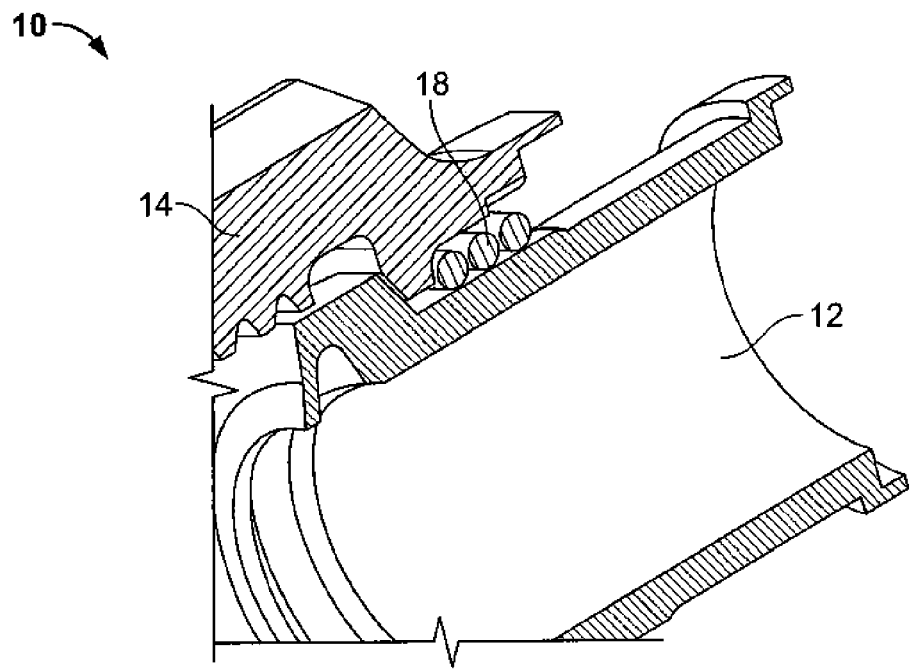
FIG. 3C is a partial, enlarged cross-sectional view of the fitting shown in FIG. 1.
Figure 4A:
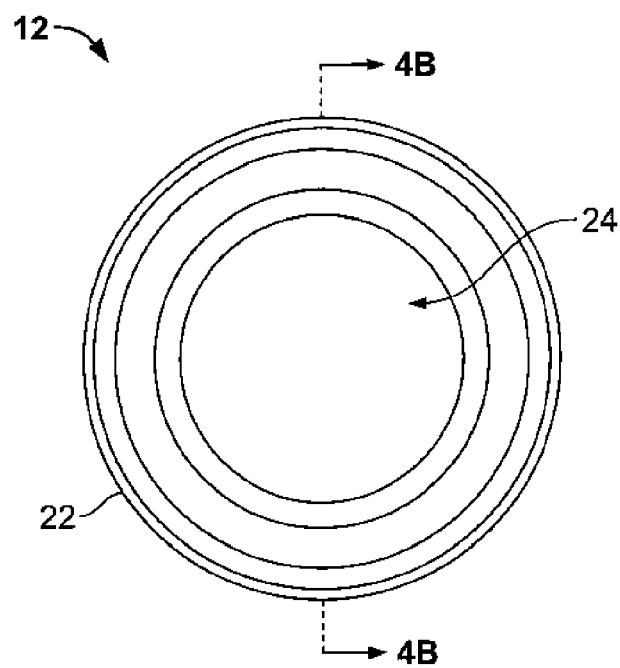
FIG. 4A is a front elevational view of a sleeve employed by the fitting shown in FIG. 1.

Referring to FIGS. 1, 2 and 3A-3C, in an embodiment, a lockwireless anti-rotation fitting 10 includes a sleeve 12, a nut 14, a retaining washer 16, and a coil spring 18. In an embodiment, the sleeve 12 is inserted and maintained within the nut 14, while the spring 18 is attached to the sleeve 12 and engages the nut 14. In an embodiment, the spring 18 is held in place by the retaining washer 16. The features and functions of the aforesaid components will be described in more detail hereinafter.

In an embodiment, the sleeve 12, the nut 14, the retaining washer 16, and the spring 18 are each made from metal. In an embodiment, the sleeve 12, the nut 14, the retaining washer 16, and the spring 18 are each made from steel. In an embodiment, the sleeve 12, the nut 14, the retaining washer 16, and the spring 18 are each made from 321 corrosion-resistant steel. In other embodiments, the sleeve 12, the nut 14, the retaining washer 16, and the spring 18 are each made from other suitable materials known in the art, such as other types of metals or metal alloys, plastics, and any suitable anti-corrosion materials.

Referring to FIGS. 4A-4D, in an embodiment, the sleeve 12 includes a first end 20, a second end 22 opposite the first end 20, and an aperture 24 that bridges the first end 20 to the second end 22. In an embodiment, the sleeve 12 is substantially cylindrical in shape. In other embodiments, the sleeve 12 can consist of other suitable shapes and sizes. In an embodiment, the sleeve 12 includes an exterior surface 26 and an interior surface 28 defined by the aperture 24. In an embodiment, the sleeve 12 is defined by a first portion 30 and a second portion 32, which converge with and transition into one another at a tapered portion 34 that is formed on the exterior surface 26. In an embodiment, the first portion 30 includes an outer diameter that is smaller than an outer diameter of the second portion 32. In other embodiments, the outer diameter of the first portion 30 is substantially the same as or equal to the outer diameter of the second portion 32. In an embodiment, the first portion 30 includes a flange 36 formed proximate to the first end 20 (see, in particular, FIG. 4C), while the second portion 32 includes a head 38 formed at the second end 22. The aperture 24 includes a tapered portion 40 formed within the head 38 and proximate to the second end 22.

Referring to FIGS. 5A-5C, in an embodiment, the nut 14 includes a first end 42, a second end 44 opposite the first end 42, and an aperture 46 that extends from the first end 42 to the second end 44. In an embodiment, the nut 14 includes an exterior surface 48 and an interior surface 50 defined by the aperture 46. In an embodiment, a gripping portion 52 extends from the exterior surface 48 and intermediate the first and second ends 42, 44. In an embodiment, the gripping portion 52 is sized and shaped to engage a tool, such as wrench, to facilitate the installation and removal of the fitting 10. In an embodiment, the gripping portion 52 is hexagonal in shape. In other embodiments, the gripping portion 52 consists of other suitable shapes and sizes known in the art.

Still referring to FIGS. 5A-5C, in an embodiment, the aperture 46 includes a first interior portion 54 that extends from the first end 42 to a point 56 intermediate the first and second ends 42, 44, and a second interior portion 58 that extends from the second end 44 to the point 56. In an embodiment, internal threads 60 are formed on the interior surface 50 of the second interior portion 58 of the aperture 46. In an embodiment, a partition 62 is formed within the aperture 46 proximate to the point 56, and which separates the first and second interior portions 54, 58 from one another. In an embodiment, proximate to the first end 42 of the nut 14, the first interior portion 54 of the aperture 46 is broken down into a plurality of stepped portions 64a-c, which form corresponding ledges 66a-c.

Still referring to FIGS. 5A-5C, in an embodiment, the nut 14 further includes a plurality of serrations 68 that are circumferentially formed within an interior surface 70 of the stepped portion 64b. In an embodiment, each of the serrations 68 is sinusoidal in shape. In another embodiment, each of the serrations 68 is saw-tooth in shape. In another embodiment, each of the serrations 68 is rectangular in shape. In other embodiments, each of the serrations 68 consist of other suitable shapes and sizes. The purpose and function of the serrations 68 shall be described hereinafter.

Figure 6A:
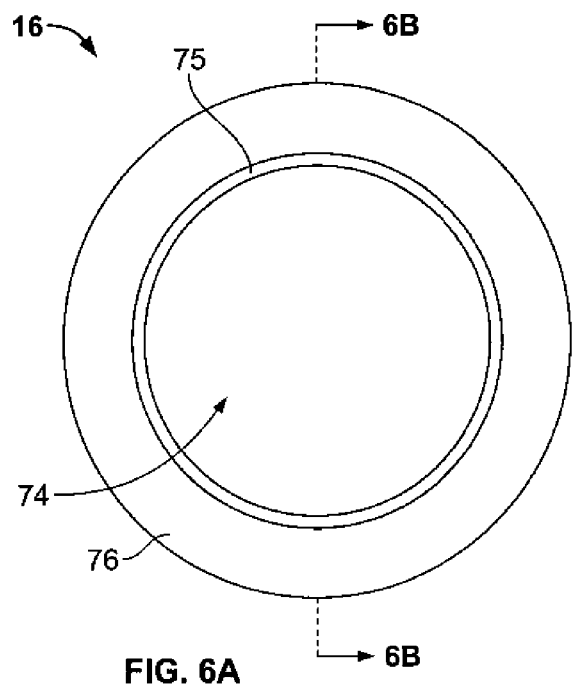
FIG. 6A is a bottom plan view of a retaining washer employed by the fitting shown in FIG. 3A.
Figure 6B:
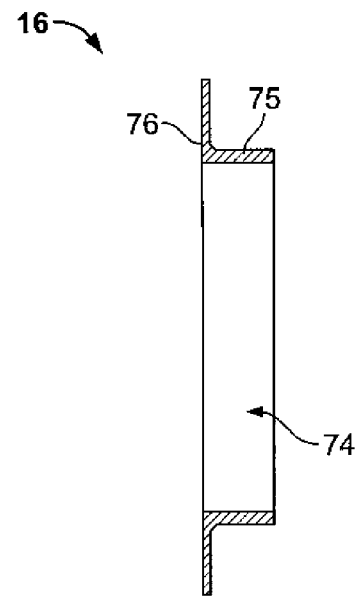
FIG. 6B is a cross-sectional view, taken along line 6B-6B and looking in the direction of the arrows, of the retaining washer shown in FIG. 6A.
Figure 7A:
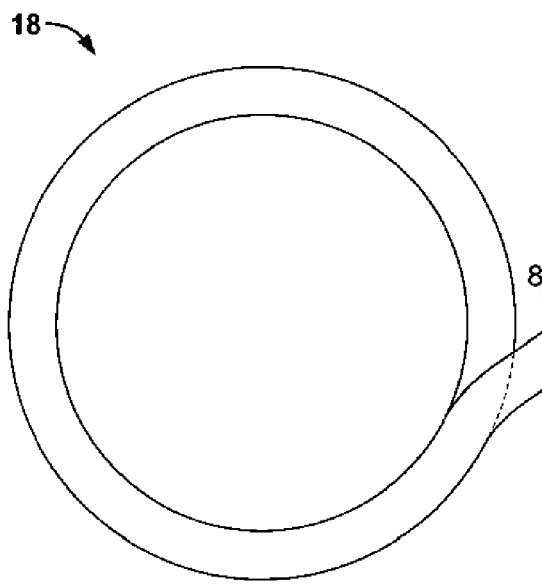
FIG. 7A is a top plan view of a spring employed by the fitting shown in FIG. 3A.
Figure 7B:
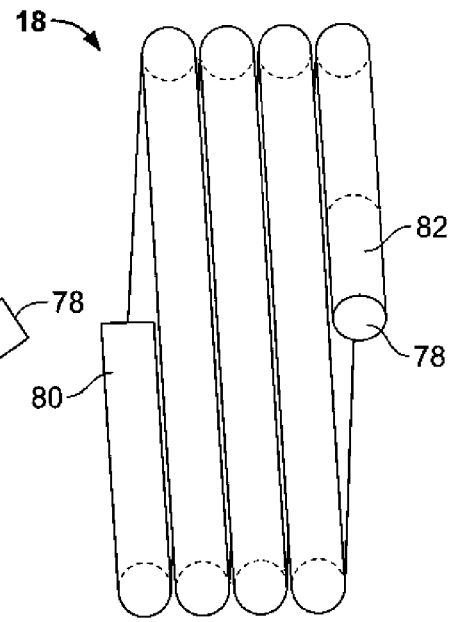
FIG. 7B is a side elevational view of the spring shown in FIG. 7A.

Referring to FIGS. 6A and 6B, in an embodiment, the retaining washer 16 includes a centrally-located, circular-shaped aperture 74, a hat section 75, and a circular-shaped flange 76 extending from the hat section 75 and surrounding the aperture 74. Referring to FIGS. 7A and 7B, the spring 18 includes a first end 78 and a second end 80 opposite thereof, and a tab 82 that extends angularly from the first end 78 of the spring 18. In an embodiment, the spring 18 can include any number of coils as desired. In an embodiment, the spring 18 may include any size diameter as required and the thickness of the coils (i.e., diameter) can be varied as desired. In other embodiments, the coils of the spring 18 can consist of any shape or size, such as round wire, square wire, etc.

Referring back to FIGS. 3A-3C, in an embodiment, the fitting 10 is assembled in the following manner. The first end 20 of the sleeve 12 is slidably inserted into the aperture 46 of the nut 14. In an embodiment, when the sleeve 12 is fully inserted within the nut 14, the head 38 of the sleeve 12 engages the partition 62 of the nut 14, which acts as a stop against the sleeve 12 so as to prevent the sleeve 12 from exiting the first end 42 of the nut 14. As a result, in an embodiment, the second portion 32 of the sleeve 12 remains concealed within the aperture 46 of the nut 14, while the first portion 30 of the sleeve 12 protrudes outwardly from the first end 42 of the nut 14. Next, the spring 18 is slidably inserted on the sleeve 12 at its first end 20 and is fitted around and grips the exterior surface 26 of the second fitting portion 32 of the sleeve 12. In an embodiment, the spring 18 is housed within the stepped portion 64c of the nut 14. As a result, the tab 82 of the spring 18 extends into the stepped portion 64b and engages the serrations 68, which semi-anchors the spring 18 to the nut 14 (see also FIGS. 8A and 8B). In an embodiment, once the spring 18 is in the aforesaid position, it is held in place by the retaining washer 16, which is inserted within the aperture 46 of the nut 14 at the first end 42 thereof. In this regard, the aperture 74 of the washer 16 slides around the first end 20 of the sleeve 12 and the flange 76 of the washer is housed within the stepped portion 64a of the nut 14 (see also FIG. 9C). In an embodiment, the first end 42 of the nut 14 is folded (e.g., bent) inwardly so as to secure the retaining washer 16 (see FIG. 9C). In other embodiments, the retaining washer 16 is secured by other means known in the art.

Figure 8A:
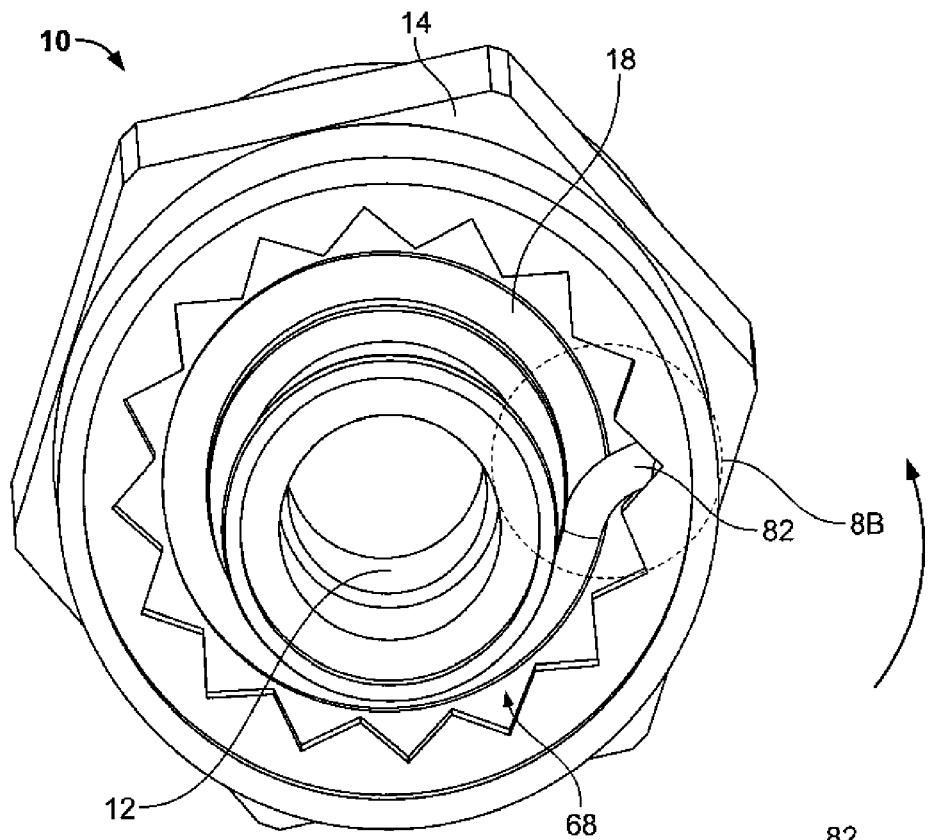
FIG. 8A is a front elevational view of the spring shown in FIG. 7A attached to the nut shown in FIG. 5A.
Figure 8B:
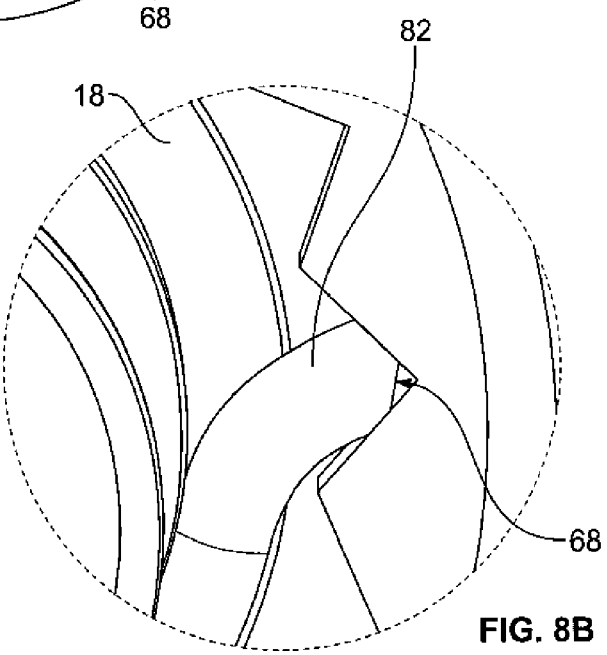
FIG. 8B is an enlarged view of Detail 8B of the spring and the nut shown in FIG. 8A.

Referring to FIGS. 8A and 8B, in an embodiment, the spring 18, which is semi-anchored to the nut 14, can only rotate inwardly or in the clockwise direction. In an embodiment, the tab 82 of the spring 18 may only ratchet over the serrations 68 when a predetermined counter-clockwise or loosening torque is applied to the nut 14. In an embodiment, the serrations 68 allow for rotation in the clockwise direction. In an embodiment, the serrations 68 are designed so that the torque, when turning counterclockwise, is high enough to prevent self-loosening. During installation and tightening of the fitting 10, the serrations 68 hold the spring in the sleeve 12. In an embodiment, the tab 82 of the spring 18 will deflect at a predetermined force to allow the nut 14 to rotate at the desired torque. In an embodiment, this torque can be increased or decreased depending on the user specification by altering the design of the fitting 10. In an embodiment, the fitting 10 can be applied to shaped fittings (e.g., elbows, tees, and crosses) as well as straight fittings.

Figure 9A:
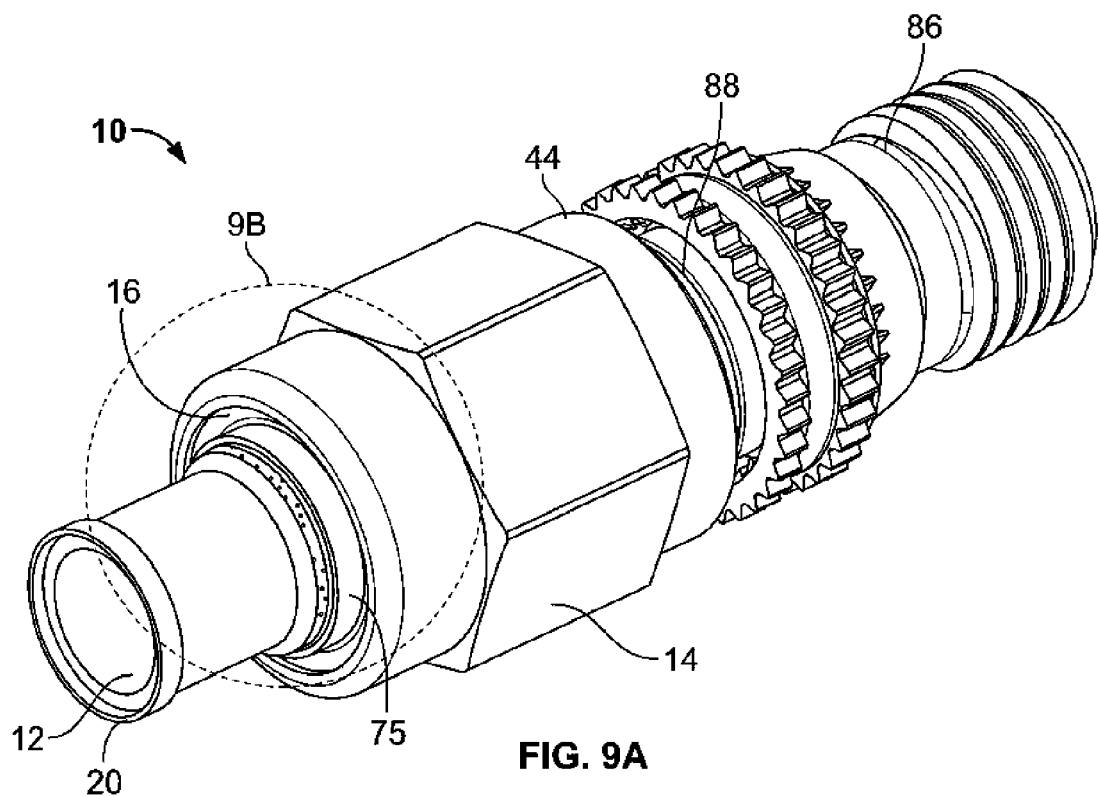
FIG. 9A is a perspective view of the fitting shown in FIG. 1 connected to a fluid connector.
Figure 9B:
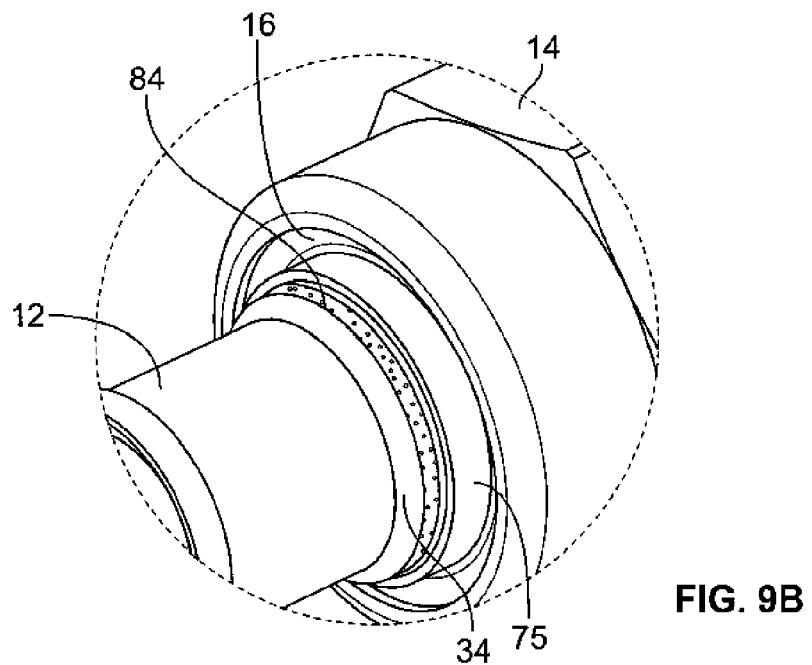
FIG. 9B is an enlarged view of Detail 9B of the fitting shown in FIG. 9A.
Figure 9C:
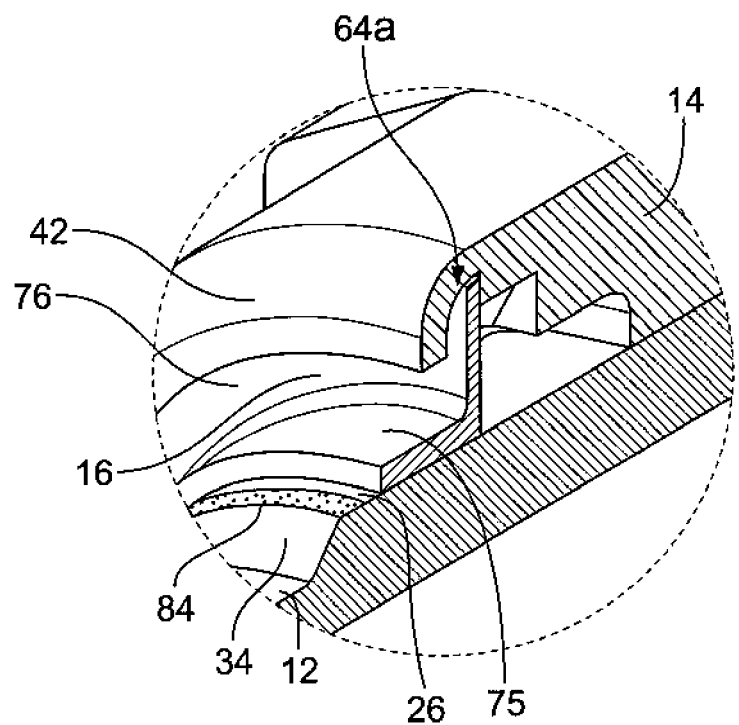
FIG. 9C is an enlarged cross-sectional view of the fitting shown in FIG. 9B.

Referring to FIGS. 9A-9C, in an embodiment, a fluid connector 86 is connected to the fitting 10 at the second end 44 of the nut 14. In an embodiment, the connector 86 includes external threads 88 that threadedly engage the internal threads 60 of the nut 14 (which are shown in FIG. 5B). In an embodiment, the connector 86 may consist of various shapes and sizes. In an embodiment, the fitting 10 and/or the connector 86 includes a sealant for providing a fluid tight seal therebetween. The exposed, first end 20 of the sleeve 12 is connected to a fluid line or another connector (not shown in the Figures).

In an embodiment, a color coded band 84 is applied to the exterior surface 26 of the sleeve 12 proximate to the tapered portion 34 and is hidden by the hat 75 of the washer 16 when the nut 14 is unseated, but is exposed when the nut 14 is in the fully seated position (see FIGS. 9A-9C). In an embodiment, the band 84 acts as a visual indicator to a user that the nut 14 is properly installed. In an embodiment, the band 84 extends circumferentially around the exterior surface 26 of the sleeve 12. In an embodiment, the band 84 includes a single color. In an embodiment, the band 84 includes a plurality of bands (not shown in the Figures). In another embodiment, the band 84 can include a groove formed within the exterior surface 26 of the sleeve 12 (not shown in the Figures). In another embodiment, the band 84 can include alphanumeric indicia (not shown in the Figures). In another embodiment, the band 84 can be measured with devices known in the art, such as a gauge.

As indicated above, the fitting 10 provides an automatic locking method to prevent the loosening of the locking nut 14. In an embodiment, an end user may attach fluid lines to the fitting 10 by using his or her fingers and by applying the final torque using a wrench until the band 84 is visually seen indicating that the fluid lines are fully seated. In an embodiment, the fitting 10 thus enables a threaded connection to remain connected without the need of safety wires.

In an embodiment, the fitting 10 includes a positive-lock feature at the location where nut 14 is wrenched onto. In an embodiment, the spring 18 grips onto the sleeve 12 and, being lightweight, it will effectively resist loosening of components due to vibration forces. The fitting 10 accommodates a large tolerance range of mating diameters. In an embodiment, the fitting 10 can accommodate a wide range of tube sizes, such as (but not limited to) tube sizes from 0.250" to 2". In an embodiment, the fitting 10 can be of any size, and can range from (but is not limited) from fitting sizes −4 to −24. The fitting 10 is relatively simple to manufacture, is cost effective, includes has minimal components, and has low weight. Fewer components reduces the potential of foreign object damage, as well as reduces weight in the fitting 10, which is a special concern in the aircraft industry where every pound can be very expensive.

It will be understood that the fitting 10 described herein is merely exemplary and that a person skilled in the art may make many variations and modifications without departing from the full spirit and the scope of the embodiment described herein. Accordingly, all such variations and modifications are intended to be included within the scope of the invention as defined in the appended claims.

What is claimed is:

1. A fitting, comprising:
   a sleeve having a first end, a second end opposite the first end, and an aperture extending from the first end to the second end;
   a nut having a first end, a second end opposite the first end of the nut, an aperture extending from the first end of the nut to the second end of the nut, a circumferential interior surface, and a plurality of radially inwardly facing serrations formed on the interior surface proximate to the first end of the nut, wherein the aperture of the nut includes a first interior portion located proximate to the first end of the nut and a second interior portion located proximate to the second end of the nut, the first and second interior portions being separated from one another by a partition;
   a coil spring having a free first end, and a tab extending outwardly and angularly from a longitudinal axis of the coil spring at the free first end of the coil spring, the tab being a part of the coil spring; and
   an L-shaped retaining washer, positioned on the sleeve and within the aperture of the nut proximate to the first end of the nut, for retaining the coil spring on the sleeve so as to prevent disengagement of the tab of the coil spring with the one of the plurality of radially inwardly facing serrations of the nut, wherein the first end of the nut is bent inwardly around the washer so as to prevent the retaining washer from disengaging the sleeve,
   the sleeve being positioned within the aperture of the nut such that the first end of the sleeve protrudes outwardly from the first end of the nut, and
   the coil spring being mounted around the sleeve and positioned within the first interior portion of the aperture of the nut, and the tab of the coil spring engages one of the plurality of inwardly facing serrations of the nut, the tab of the coil spring being adapted to engage the plurality of radially inwardly facing serrations in a first direction when a predetermined torque is applied to the nut and prevents the coil spring from rotating in a second direction opposite the first direction until another predetermined torque is applied.

2. The fitting of claim 1, wherein second end of the nut slidably receives the first end of the sleeve.

3. The fitting of claim 2, wherein the sleeve includes a head formed at the second end of the sleeve, the head being located within the second interior portion of the aperture of the nut when the nut receives the sleeve, and the head being sized and shaped to engage the partition of the nut so as to prevent the sleeve from exiting the first end of the nut.

4. The fitting of claim 3, wherein the second interior portion of the aperture of the nut is adapted to receive a connector.

5. The fitting of claim 4, wherein the second interior portion of the aperture of the nut includes internal threads that threadedly engage external threads of the connector.

6. The fitting of claim 5, wherein the nut is rotatable between an uninstalled position, in which the internal threads of the nut are disengaged with the external threads of the connector, and an installed position, in which the internal threads of the nut are engaged with the external threads of the connector.

7. The fitting of claim 6, wherein the sleeve includes an exterior surface and indicia located on the exterior surface for indicating when the nut is in its installed position.

8. The fitting of claim 7, wherein the indicia includes a band extending circumferentially around the exterior surface of the sleeve, the band being hidden visually by the washer when the nut is in its uninstalled position and exposed visually when the nut is in its installed position.

9. The fitting of claim 3, wherein the nut includes a gripping portion adapted to receive an installation tool.

* * * * *